United States Patent [19]

Laing et al.

[11] 4,292,773

[45] Oct. 6, 1981

[54] DOUBLE PANE SYSTEMS WITH LITTLE REFLECTION, IN PARTICULAR FOR GREENHOUSES

[76] Inventors: Karsten Laing, Herrenstrasse 57, 7500 Karlsruhe; Ingeborg Laing, Hofener Weg 37, 7148 Remseck 2 - Aldingen; Oliver Laing, Weissdornweg 14, 7400 Tübingen, all of Fed. Rep. of Germany

[21] Appl. No.: 68,333

[22] Filed: Aug. 21, 1979

[30] Foreign Application Priority Data

Aug. 22, 1978 [AT] Austria .................................. 6118/78
Sep. 21, 1978 [AT] Austria .................................. 6831/78
May 15, 1979 [AT] Austria .................................. 3606/79
Jun. 15, 1979 [AT] Austria .................................. 4268/79

[51] Int. Cl.³ .............................................. E06B 7/12
[52] U.S. Cl. ....................................... 52/171; 52/588; 52/788; 52/DIG. 4

[58] Field of Search ........... 52/171, 172, 788, DIG. 4, 52/202, 588

[56] References Cited

U.S. PATENT DOCUMENTS 1,694,677 12/1928 Will ....................................... 52/203
2,400,720 5/1946 Staudinger et al. ............... 52/171 X
3,679,531 7/1972 Weinand et al. ................. 52/588 X

FOREIGN PATENT DOCUMENTS 2802179 7/1979 Fed. Rep. of Germany ........ 52/788
1043272 9/1966 United Kingdom ........... 52/DIG. 4

Primary Examiner—Carl D. Friedman
Attorney, Agent, or Firm—Pennie & Edmonds

[57] ABSTRACT

A transparent double pane construction for use as a building panel where at least one pane is made of a transparent organic material spaced from the other panel. The panel made of the organic material has a surface made up of a hydrophilic material.

22 Claims, 8 Drawing Figures

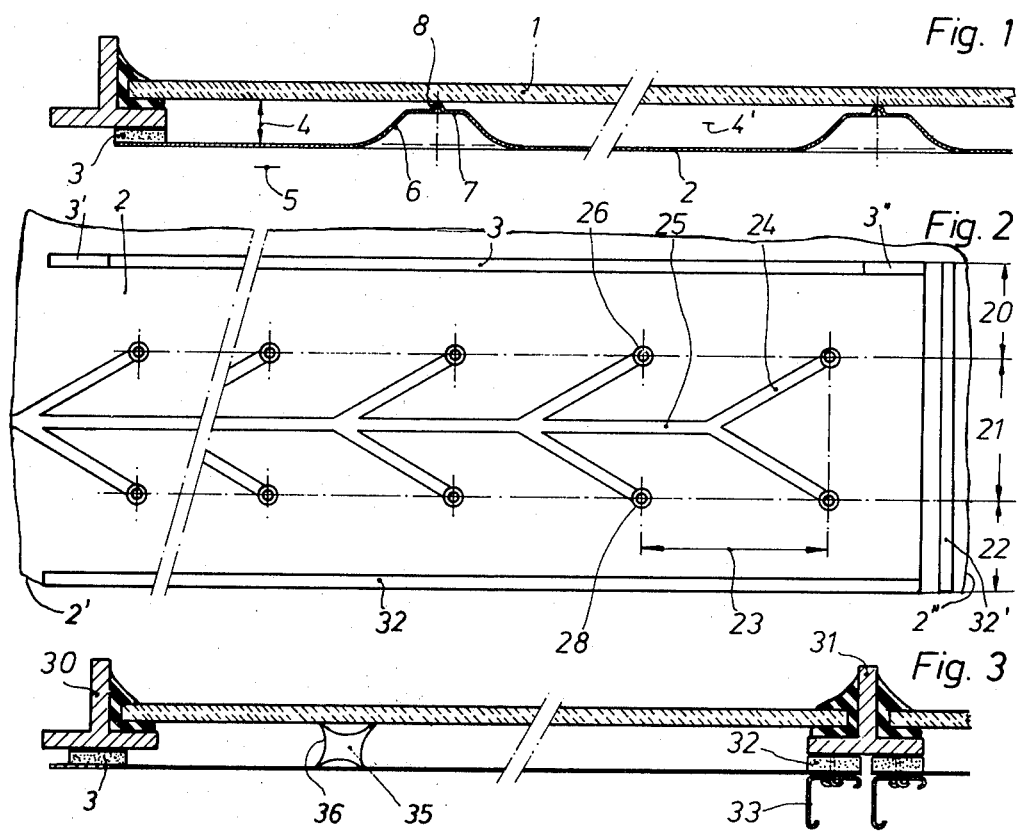
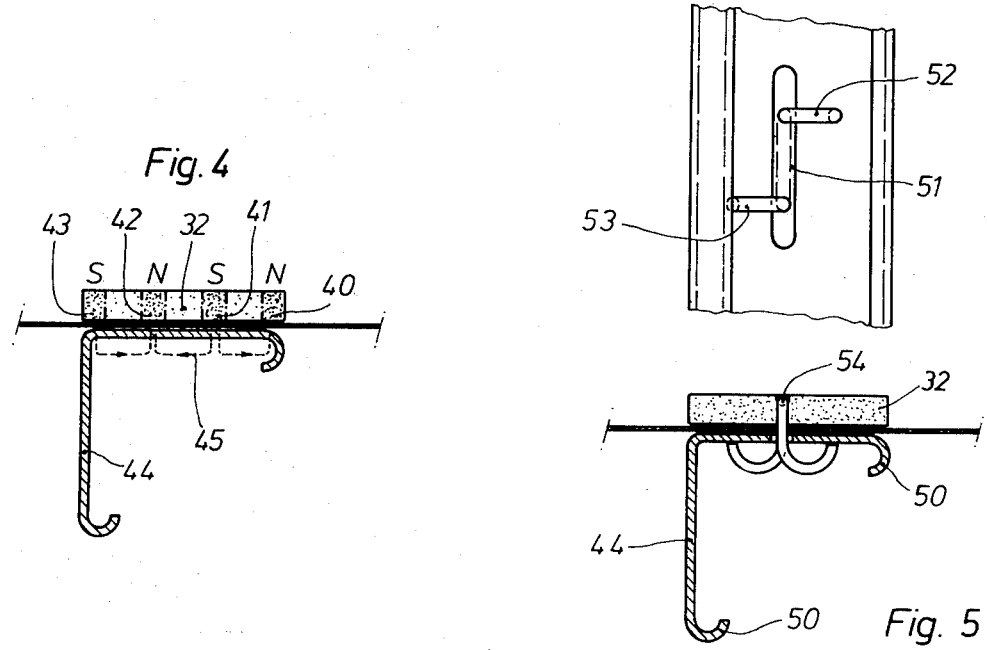

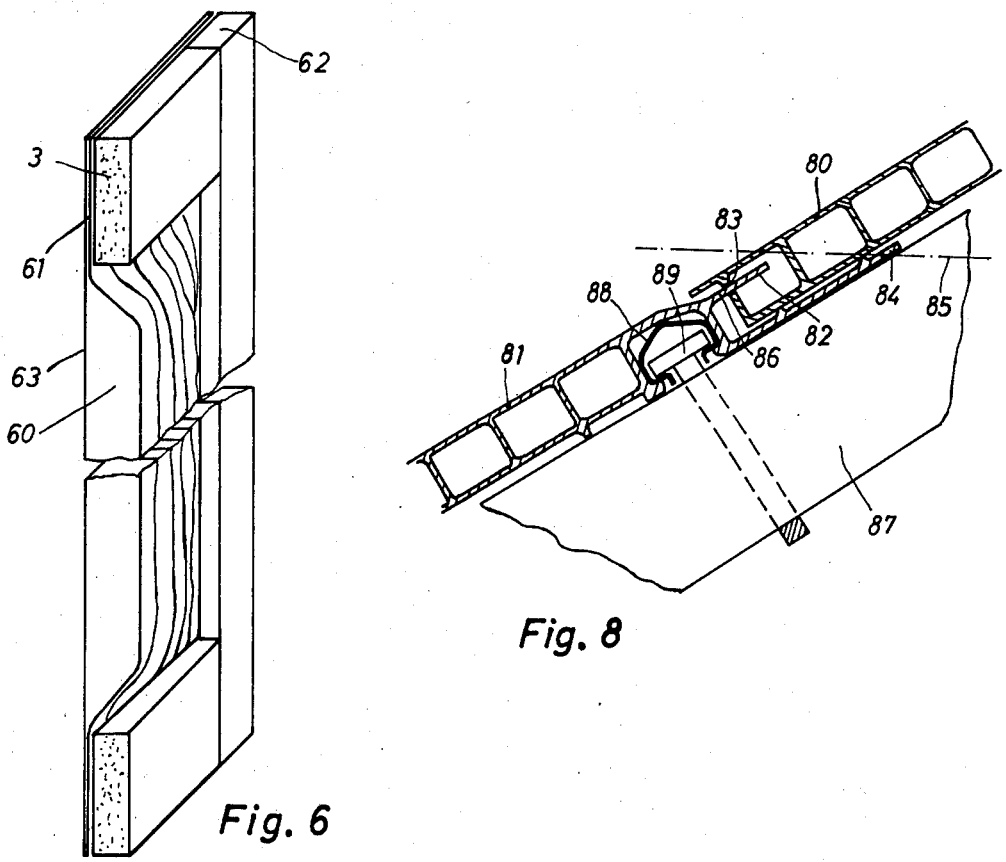
Fig. 6
Fig. 8
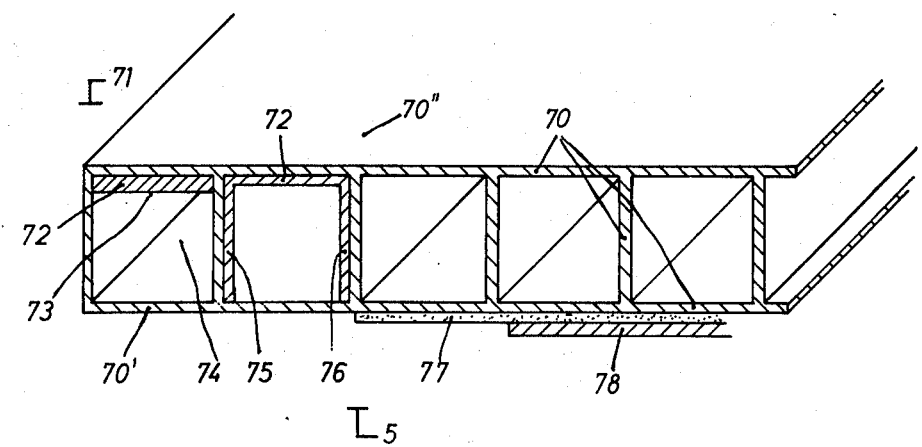
Fig. 7

DOUBLE PANE SYSTEMS WITH LITTLE REFLECTION, IN PARTICULAR FOR GREENHOUSES

FIELD OF THE INVENTION

This invention relates to a transparent double pane construction used as building panels in greenhouses and the like.

BACKGROUND OF THE INVENTION

Increase in heating costs has led to new greenhouses being equipped with double panes and existing greenhouses being fitted subsequently with secondary panes. In new greenhouses, unbreakable double webbed plates are replacing glass and in existing singly glazed greenhouses, additional panes are being added in the form of sheeting made of an organic material. In both cases basic disadvantages have arisen in that the transparent plates or sheeting when made of organic material tend toward the condensation of droplets, a property that glass does not have. Because of this droplet condensation, up to 40% of the radiant energy is reflected which leads to reduced light, particularly during the winter period, when the light is poor as well as reduced solar heating.

It is therefore an object of the invention to provide for panes of sheeting or double webbed plates made of transparent organic material which do not have these disadvantages.

DESCRIPTION OF THE INVENTION

Broadly a transparent double pane construction according to the invention comprises two panes spaced apart where at least one of the panes is made of an organic material and where at least one surface of one of the panes comprises a hydrophilic transparent material. By making a pane which is imperiled by droplet condensation of a hydrophilic material, any condensation tending to occur between the panes appears in the form of a film of water which is optically non-disturbing. The hydrophilic material may comprise saponifiable materials, such as for example cellulose acetate or alternatively cellulose butyrate, or a supporting material of high strength may be used, such as for example polyester, polycarbonate or polyacrylate, which is coated with a saponifiable transparent lacquer. Since saponification does not in itself prevent condensation, an additional feature of the invention provides means for conveying any condensate that may form in enclosed spaces within the construction to the exterior. The invention further relates to means for attachment of the panes to supporting structure by way of magnetic strips acting with mounting strips.

BRIEF DESCRIPTION OF THE DRAWINGS

FIG. 1 is a cross-sectional view of a transparent double pane construction according to the invention;

FIG. 2 is a top view of the construction of FIG. 1;

FIG. 3 is a view similar to FIG. 1 illustrating the construction of spacer elements for separating panes;

FIG. 4 is an enlarged view of a portion of FIG. 3 illustrating magnetic lines of force between magnetic strips and mounting strips;

FIG. 5 is an enlarged view of a portion of FIG. 3 illustrating structural details of a mounting bracket;

FIG. 6 is a perspective view of a magnetically held webbed plate;

FIG. 7 is a cross-sectional view of a design of a double webbed pane constructed according to the invention; and FIG. 8 is a sectional view of a joint between two superposed double webbed panes constructed according to the invention.

BEST MODES FOR CARRYING OUT THE INVENTION

Referring to FIG. 1 a glass pane 1 and an underlying sheeting pane 2 are illustrated which are held together by permanent intermediate magnetic strips 3 attracted to iron cross bars 30 and where the oxide material is carried in rubber elastic or plastic cement. The surface of the sheeting pane 2 which comprises a first pane which is adapted to be directed toward the internal space 5 of a building is coated, for example by lacquering, with a saponifiable layer. After coating, the surface of this layer directed towards the inside of the building is saponified. The acetate or butyrate portion of the pane made water soluble by saponification is then washed out.

The distance 4 is selected such that even at the highest temperature differences found between the internal space 5 and the glass or second pane 1, no thermal convection is established. This distance is approximately 17 mm. Protrusions 6 are produced by plastic deformation of the first pane such that the protrusions are preferably converted into a parallel surface 7 which in turn has a small almost point-like projecting protrusion 8.

FIG. 2 shows, in top view, the distribution of these protrusions 8 on a first pane running, with the magnetic strip 3, parallel to the slope or fall lines of a building roof. A series of protrusions 8 are preferably distributed over the width of a pane such that the distances 20, 21 and 22 are related as 2:3:2. The next series of protrusions is spaced at a distance 23, which corresponds to 1.5 to 2 times the distance 20. The tracks 24 serve for the diversion of condensate all of which discharges into a collecting track 25 and these tracks are made hydrophilic by saponification. This is effected pursuant to the invention in that the track regions are imprinted with a cellulose-acetate lacquer and are subsequently saponified by hydroxides, as a result of which the acetate or butyrate portion becomes water soluble and is thereupon washed out. Condensate flowing off across the regions 8, 7 and 6 flows, without droplet formation, as a thin film along these tracks to the lowest level of the first pane.

As the forces acting on a first pane are greatest at the two ends of the pane, magnetic end strips 32 having a stronger magnetic force than intermediate strips 3 are provided. In addition the outer regions 3' of the magnetic strips 3 may have a concentrated magnetic force. The center region of the strips 3 may thus pursuant to the invention alternatively consist of isotropic magnetic material. The edge strips 2' and 2" of the first pane are placed on structural elements of a greenhouse running horizontally and are connected to the structural elements by way of magnetic strips 32'. The entire internal space 4' of the double pane construction of FIG. 1 is sealed off from the internal space 5 for the prevention of condensation.

FIG. 3 illustrates the arrangement of the magnetic strips by which the first pane 2 is attached to iron cross bars 30 and 31. The magnetic strips 32 are preferably thoroughly magnetized and connected by way of brackets to the iron mounting strips 33. Sections of the first panes are preferably arranged side by side such that one piece elements of 3 to 6 meters are produced.

The panes 1 and 2 may be spaced apart by spacers 35 instead of by protrusions 8. Spacers 35 are attached to the pane 1 and have recesses 36 on one or alternatively on two sides which act as suction cups. Not all structural features on the means connecting or supporting the panes are limited to panes having a hydrophilic surface.

FIG. 4 illustrates the magnetic circuit between the magnetic strip and a mounting strip. It may be seen that the magnetic circuit of the poles 40 and 43 of the magnetized anisotropic magnetic rubber strip 32 is effected by the iron of the bar 44. The lines of force of the magnetic circuit running in the iron are represented symbolically by the dashed lines of 45.

FIG. 5 illustrates a mechanical design of a connection of a first pane and a magnetic strip. The bar 44 has a U or L-shaped section with a turned up edge 50 and, at regular intervals of, for example 10 cm, slots 51. The arms 52 and 53 of the brackets 54 project through these slots and are bent in opposing directions. The force of the bent brackets is such that the back 54 of the bracket penetrates into the magnetic strip so that no projections are produced. The slots 41 are longer than the back of the brackets to accommodate the differences in expansion between the iron, pane materials and rubber materials. The cross bars 30 and 31 which are good heat conductors are alternatively insulated by the magnetic strips 32 comprising a heatinsulating material so that the streams of heat preferably transversing these regions nears zero.

The first pane comprising sheeting and magnetic strips requires no saponified surface when the internal space 5 has such a high moisture that the droplets resulting from condensation coalesce.

FIG. 6 illustrates a double webbed plate for placement in the vertical walls of a greenhouse. The invention therefore provides for assembling these areas with webbed plates having channels 60 extending where the channels are closed off at their ends 61 by thermoplastic deformation. Magnetic strips 3 are set on these areas while magnetic strips 62 are placed in the edge region. Since these regions of a greenhouse are insulated by three panes, the saponification pursuant to the invention is as a rule unnecessary.

FIG. 7 illustrates a double webbed plate constructed pursuant to the invention which is provided, in particular, for the external roofing of greenhouses. The double webbed plate 70 proper is extruded from a transparent polycarbonate or alternatively a polyacrylate material. A saponifiable layer 72 is included on the inner surface of the second pane where the second pane faces the external space 71 of a building. The surface 73 of layer 72 is saponified and washed out. Instead of a saponified layer, a layer of another material capable of swelling, for example polyvinyl alcohol, may alternatively be used. Water penetrates permanently through the surface 70', is directed toward the internal space 5, so that within the channel 74 such a high air moisture prevails that the swellable layer 72 is almost constantly saturated with water. As a result molecules of water penetrate permanently through the surface 70, towards the external space 71, so that even when the channels 74 are closed at both ends to prevent the formation of algae, no accumulations of water forms in the channels 74. This effect is further enhanced when at least three layers 75, 72 and 76 are provided. An additional improvement pursuant to the invention is that the surface of the first pane 70' is directed towards the interior of a building is coated with a water vapor sealing layer 77, for example of polyvinyl chloride, whereby the penetration of water vapor from the inside 5 of the building to the channels 74 is reduced. In order to prevent droplet condensation at the surface of pane 70' directed toward the inside of the building, an additional saponifiable layer 78 may be placed directly on the surface 70' or on the vapor sealing layer 75.

FIG. 8 illustrates the connection of two double webbed plates 80 and 81 mounted one above the other. A projection 82 of the plate 81 projects into a slot 83 of the plate 80. An additional projection 84 of the lower plate extends under the upper plate and projects out over the upper horizontal line 85 of the projection 82. This insures that condensate flowing away from the lower side of the upper plate 80 reaches the outside. To this end, cuts 86 are advantageously arranged in the projection 82. The double webbed plates 80 and 81 advantageously rest on the cross bar 87 comprising a flat material. To prevent sagging of the plate 81, metal sections 88 are inserted which simultaneously serve to receive fastening means 89 which are displaceable lengthwise with respect to the plates. This feature likewise is not limited to webbed plates with hydrophilic surfaces.

What is claimed is:

1. A transparent double pane construction forming a double webbed plate for use as a building panel comprising a first pane of a transparent organic material having a superficial layer of a hydrophilic material the surface of which is superficially saponified spaced from a second pane of a transparent material to form an enclosed space between said panes, where the first pane is adapted to be on the inside of a building, where the surface of the first pane which faces the inside of the building comprises said superficial layer and where the surface of the first pane which faces towards the enclosed space has regions along a fall line which are hydrophilic.

2. A transparent double pane construction according to claim 1 further characterized in having magnetic strips at the axial ends of the double pane construction connecting end regions of the first pane to supporting elements.

3. A transparent double pane construction according to claim 2 further characterized in that the length of the panes is such as to extend over said supporting elements.

4. A transparent double pane construction according to claim 2 further characterized in that magnetic strips adapted to extend along fall lines are stiffened by mounting strips.

5. A transparent double pane construction according to claim 1 further characterized in that a plurality of protrusions are provided on the surface of the first pane directed towards the second pane.

6. A transparent double pane construction according to claim 1 further characterized in having a plurality of spacers between the panes.

7. A transparent double pane construction according to claim 6 further characterized in that said spacers are provided with suction surfaces.

8. A transparent double pane construction forming a double webbed plate for use as a building panel comprising a first pane of a transparent organic material having a superficial layer of a hydrophilic material the surface of which is superficially saponified spaced from a second pane of a transparent material to form an enclosed space between said panes, where the second pane is adapted to be on the exterior of a building and where the surface of the second pane facing towards the inside of the building comprises a hydrophilic material.

9. A transparent double pane construction according to claim 8 further characterized in having vertically extending members between the two panes forming a plurality of parallel extending channels and in that the surfaces of the vertically extending members directed towards the channels are hydrophilic.

10. A transparent double pane construction according to claim 9 further characterized in that the surface of the first pane which is directed towards the inside of the building comprises a water vapor sealing layer.

11. A transparent double pane construction according to claim 10 further characterized in having an additional layer having a hydrophilic surface adjacent the water sealing layer and facing the inside of the building.

12. A transparent double pane construction according to claim 8 forming a double webbed plate further characterized in that one edge of the structure has a projection adapted to extend under an adjacent double webbed plate.

13. A double pane construction according to claim 8 forming a double webbed plate further characterized in having a cross-section of flat sections set on edge supporting said construction.

14. A transparent double pane construction according to claim 8 forming a double webbed plate further characterized in that said construction has an upper projection on one end adapted to engage a slot within an adjacent double webbed plate.

15. A transparent double pane construction according to claim 14 further characterized in having a lower projection below said upper projection and extending beyond said upper projection.

16. A transparent double pane construction according to claim 8 further characterized in that the end regions of said construction are thermally deformed to eliminate the spacing between the panes while one pane retains a planar form.

17. A transparent double pane construction forming a double webbed plate for use as a building panel including a first pane of a transparent organic material having a superficial layer of a hydrophilic material the surface of which is superficially saponified, a second pane of a transparent material spaced from said first pane to form an enclosed space therebetween where the first pane is adapted to be on the inside of a building and where the surface of the first pane which faces the inside of the building comprises said superficial layer, end magnetic strips included at the axial ends of the double pane construction connecting end regions of the first pane to supporting elements, and intermediate magnetic strips positioned between the end magnetic strips to connect middle regions of the first pane to supporting elements where the end magnetic strips have a higher magnetic force than said intermediate magnetic strips.

18. A transparent double pane construction according to claim 17 further characterized in that said mounting strips are made of iron and form a magnetic circuit with the magnetic strips.

19. A transparent double pane construction according to claim 17 further characterized in that the first pane extends between the magnetic strips and said mounting strips.

20. A transparent double pane construction according to claim 19 further characterized in that a magnetic strip is connected by brackets to a mounting strip so as to be longitudinally displaceable therewith.

21. A transparent double pane construction forming a double webbed plate for use as a building panel having a first pane of a transparent organic material having a superficial layer of a hydrophilic material the surface of which is superficially saponified, a second pane of a transparent material spaced from the first pane to form an enclosed space between said panes where the second pane is adapted to be on the exterior of a building, where the surface of the second pane facing towards the inside of the building comprises a hydrophilic material, where one edge of the construction has a projection adapted to extend under an adjacent double webbed plate and where said projection has an undercut channel opened towards the inside of the building adapted to receive a supporting means.

22. A double pane construction according to claim 21 further characterized in that said channel is lined with a sheet metal section.

* * * * *